Patented Aug. 18, 1936

2,051,257

UNITED STATES PATENT OFFICE 2,051,257

STABILIZED ORGANIC COMPOSITION

Harry N. Holmes, Oberlin, Ohio, assignor to Parke, Davis & Company, Detroit, Mich., a corporation of Michigan No Drawing. Application March 9, 1934, Serial No. 714,842

7 Claims. (Cl. 167—81)

The invention relates to stabilizing agents for vitamins and vitamin-containing products, particularly those containing vitamin A.

One of the principal objects of the invention is to obtain stabilized vitamin preparations in which the tendency for diminishing the vitamin activity is less than in any compositions heretofore known.

Another object of the invention is to obtain stabilized vitamin products which are protected from deterioration when at temperatures considerably above normal climatic temperatures.

A further object of the invention is to obtain stabilizing agents for vitamin-containing preparations which possess no harmful physiological effects when incorporated in the vitamin composition in amounts sufficient to give effective stability.

I have discovered that the above and other objects may be attained by means of certain heretofore unrecognized vitamin stabilizers. In the broader aspects of my invention the new stabilizing agents for vitamin-containing materials comprises the phospholipins such as lecithin, cephalin (kephalin) cuorin, sphingomyelin and the like. More particularly I have discovered that lecithin is of especial value and may be incorporated in vitamin-containing materials to obtain compositions which are stabilized against vitamin deterioration. I have also found that the phospholipins and particularly lecithin may be used in combination with other types of antioxidants without the latter interfering with the stabilizing action of the phospholipins.

One of the best materials for preserving vitamin activity is soy bean lecithin, not only because of its stabilizing efficiency but also because of its freedom from undesirable odor and color and its commercial availability. Other materials that are also useful are egg lecithin and lecithin obtained from various other natural sources.

As a practical example of my invention, I have found that halibut liver oil may be stabilized against vitamin deterioration and oxidation by incorporating therein from 1 to 1.2% of commercial lecithin obtained from soy beans. I have made tests on this vitamin stabilized product by exposing the same to the open air at normal temperatures and periodically testing for vitamin A potency. I have also subjected the same material to accelerated tests by exposing the same to an atmosphere of pure oxygen at a temperature of 95° C. In both the normal and accelerated tests I have found that lecithin stabilized halibut liver oil shows a remarkably low deterioration in vitamin A potency and that this deterioration is far less than unstabilized halibut liver oil. My tests have also shown that the lecithin stabilized halibut liver oil has far less vitamin loss than corresponding oil stabilized with known phenolic stabilizers such as hydroquinone.

As a further example of my invention, I have incorporated both lecithin and hydroquinone in halibut liver oil. My tests have shown that the use of these two stabilizing agents gives still better protection to the vitamin A. This indicates a reinforcing action mutually produced between the two antioxidants especially after a certain time interval. It also shows that there is no interference between the two antioxidants.

My invention is of utility not only for the preservation of halibut liver oil but also is useful for stabilizing other vitamins and vitamin-containing materials against oxidation and vitamin deterioration. As further examples I may mention cod liver oil, tuna liver oil and other fish liver oils, the known vitamins individually or in mixtures with one another, either in the concentrated or crude forms in which they are found in nature, and even materials which are not generally considered vitamins but which have vitamin-like activity such as carotene and irradiated ergosterol.

Due to the extremely high protective action exercised by the phospholipins for vitamins and products containing them, I have found it possible for the first time to prepare these substances in pill or tablet form by incorporating them with binding agents such as starch, milk sugar and the like substances having no harmful physiological action and by also incorporating my new stabilizers I obtain products which are easy to administer and which retain their vitamin activity for practical periods of time under the usual conditions of storage and use.

The stabilizers of my invention are of especial value when used with vitamin concentrates wherein vitamin activity is present in abnormally large amounts. A further advantage is the great solubility of phospholipins in oils which also contain vitamins and especially in fish liver oils of all kinds.

The concentration of the lecithin or other phospholipin may vary within wide limits from only traces up to such substantial amounts that the lecithin begins to affect the appearance or other properties of the composition. However, I prefer to use above about 0.1 per cent based upon the weight of oil or other composition being stabilized.

What I claim as my invention is:

1. A stabilized vitamin preparation comprising a product containing vitamin A in concentration substantially greater than in natural products and a relatively small amount of phospholipin as a stabilizing agent for inhibiting the destruction of the vitamin A activity.

2. A stabilized vitamin preparation comprising a product containing vitamin A in concentration substantially greater than in natural products and a relatively small amount of lecithin as a stabilizing agent for inhibiting the destruction of the vitamin A activity.

3. A stable vitamin preparation comprising fish liver oil having high concentration of vitamin A and a relatively small amount of lecithin as a stabilizing agent inhibiting the destruction of the vitamin A activity.

4. A stable vitamin preparation comprising halibut liver oil having high concentration of vitamin A and having vitamin D also and a relatively small amount of lecithin as a stabilizing agent inhibiting the destruction of the vitamin A activity.

5. A stable vitamin preparation comprising halibut liver oil containing vitamins A and D and relatively small amounts of hydroquinone and lecithin as a stabilizing agent inhibiting the destruction of the vitamin A activity.

6. A process for stabilizing concentrated vitamin preparations comprising adding to a vitamin product having high vitamin A concentration a relatively small amount of a phospholipin to inhibit the destruction of the vitamin A activity.

7. The process of stabilizing halibut liver oil to prevent loss of vitamin A activity which comprises adding to halibut liver oil having vitamins A and D therein a relatively small amount of lecithin to inhibit the destruction of the vitamin A activity.

HARRY N. HOLMES.